United States Patent [19]

Rottner et al.

[11] Patent Number: 5,681,003
[45] Date of Patent: Oct. 28, 1997

[54] PHOTOGRAPHIC FILM HANDLING METHOD AND APPARATUS

[75] Inventors: Bruce E. Rottner; Joseph Stanley Jastrzembski, both of Rochester, N.Y.

[73] Assignee: Eastman Kodak Company, Rochester, N.Y.

[21] Appl. No.: 221,436

[22] Filed: Mar. 31, 1994

[51] Int. Cl.$^6$ ............................................. G03B 23/02
[52] U.S. Cl. .................. 242/348.3; 242/354; 242/564.4
[58] Field of Search ........................... 242/332.2, 348.3, 242/354, 535.1, 564.4, 566, 535.3, 538.3, 538.4, 348.4; 74/664, 665 R, 665 F, 665 G, 810.1; 192/48.2, 48.3, 48.92

[56] References Cited

U.S. PATENT DOCUMENTS

| | | | |
|---|---|---|---|
| 3,039,710 | 6/1962 | Walter | 242/535.1 X |
| 3,276,708 | 10/1966 | Yefsky | 242/564.4 X |
| 3,493,193 | 2/1970 | Crandall et al. . | |
| 3,743,212 | 7/1973 | Michaels | 242/535.1 X |
| 3,883,086 | 5/1975 | Zangenfeind et al. | 242/564.4 X |
| 4,555,076 | 11/1985 | Uchiyama | 242/332.2 X |
| 4,992,812 | 2/1991 | Smart . | |
| 5,031,852 | 7/1991 | Dowling et al. . | |
| 5,075,707 | 12/1991 | Shibayama et al. . | |
| 5,148,198 | 9/1992 | Shiba . | |
| 5,212,512 | 5/1993 | Shiota . | |
| 5,215,273 | 6/1993 | Greene . | |
| 5,221,940 | 6/1993 | Daitoku et al. . | |
| 5,231,439 | 7/1993 | Takahashi et al. . | |

Primary Examiner—Daniel P. Stodola
Assistant Examiner—William A. Rivera
Attorney, Agent, or Firm—Frank Pinecelli

[57] ABSTRACT

A method and apparatus for driving film out of and rewinding film back into a thrust film cartridge. The drive mechanism comprises: a nest for holding the thrust cartridge in a predetermined position; a first clutch having a drive shaft designed for engaging the spool for transferring rotational movement to the spool; a pair of metering rolls for receiving the filmstrip therebetween for advancing the film strip out of the thrust cartridge, one of the metering rolls having a drive shaft; a second clutch connected to the drive shaft of one of the metering rolls; a single drive motor; a connecting linkage for connecting the drive motor to the first and second clutches so as to impart rotational mode to the drive shafts; and a switching device for selectively activating the first and second clutches so as to drive the metering rolls and spool in the appropriate sequence.

13 Claims, 3 Drawing Sheets

PHOTOGRAPHIC FILM HANDLING METHOD AND APPARATUS

FIELD OF INVENTION

The present invention relates to a photographic film handling method and apparatus, and more particularly to a drive mechanism and method for driving film out of and rewinding film back into a thrust film cartridge.

BACKGROUND OF THE INVENTION

Commonly assigned U.S. Pat. Nos. 5,031,852 and 5,215,273 disclose a film cartridge/cassette wherein a film roll, whose outermost convolution is a film leader, is coiled about a spool rotatably mounted within the cartridge for allowing film winding and unwinding. Typically, this cartridge is referred as a thrust type cartridge. Applicant hereby incorporates by reference the U.S. Pat. Nos. 5,031,852 and 5,215,273 patents. These type cartridges allow for further handling in the photofinishing process. For example, it is possible to individually deliver the cartridges to a photographic work station whereby the film can be thrust out of the thrust cartridge and passed over a print scanning station where images stored on the photographic film can be exposed and printed onto a photographic paper. After this has been done, the photographic filmstrip is then rewound back into the thrust cartridge. Quite often the film may contain other information in the form of bar code information placed along the edges of the filmstrip and other information provided in other formats, for example, fat bit. Additionally, these films may be provided with information that has been placed magnetically onto the film. Thus, at a print scanning station this information can be obtained and be used to keep track of the film and/or provide additional information on the prints that are being provided. Typically the film may be thrust out of the cartridge by rotating the spool on which the film has been secured. However, in certain situations, for example, such as in the print station of a printer, the manner in which the process film is supplied can affect whether or not appropriate information can be obtained from the film.

For example, if the velocity and speed is not precisely controlled, the ability of the reader to read the magnetic or other coded information may be significantly affected such that the information can not be used or is so poorly read that the information obtained is not useful. In order to overcome this problem, it has been suggested more than one mechanism be used for driving the film out of the thrust cartridge and rewinding the filmstrip back into the thrust cartridge. One disadvantage of this approach is that it does not lend itself to a compact design and requires the expense of two motors and their accompanying power supplies and associated driver board to drive the filmstrip.

SUMMARY OF THE INVENTION

In one aspect of the present invention there is provided a drive mechanism for driving film out of and rewinding film back into a thrust film cartridge. The thrust film cartridge having a spool rotatably mounted therein around which is wound a photographic filmstrip. The drive mechanism comprises:

a nest for holding the thrust cartridge in a predetermined position;

a first clutch having a drive shaft designed for engaging the spool for transferring rotational movement to the spool;

a pair of metering rolls for receiving the filmstrip therebetween for advancing the film strip out of the thrust cartridge, one of the metering rolls having a drive shaft;

a second clutch connected to the drive shaft of one of the metering rolls;

a single drive motor;

a connecting linkage for connecting the drive motor to the first and second clutches so as to impart rotational mode to the drive shafts; and a switching device for selectively activating the first and second clutches so as to drive the metering rolls and spool in the appropriate sequence.

In another aspect of the present invention, there is provided a method of driving the filmstrip out of and rewinding the filmstrip back into a thrust cartridge having a rotatable spool mounted therein around which the photographic filmstrip is wound. The method utilizes a single drive mechanism for driving the filmstrip out of and rewinding the filmstrip back into the thrust cartridge. The method comprises the steps of:

a) thrusting the filmstrip out of the thrust cartridge by a drive mechanism which is connected to a first clutch for rotating the spool on which the filmstrip is wound;

b) providing a pair of metering rolls and a sensor for sensing when the filmstrip has initially passed through the metering rolls, one of the metering rolls being connected to the drive mechanism through a second clutch for driving the metering rolls;

c) disengaging the first clutch after a predetermined length of the filmstrip has passed through the metering rolls;

d) driving the metering rolls for continued thrusting of the filmstrip out of the thrust cartridge;

e) stopping the removal of the filmstrip from out of the thrust cartridge by the metering rolls when the filmstrip has reached a predetermined position;

f) disengaging the second clutch connected to the drive mechanism so as to stop driving of the metering rolls; and g) activating the first clutch in the drive so as to rewind the filmstrip back into the thrust cartridge.

The present invention provides an apparatus and method which is relatively compact in design, which is relatively inexpensive and can be used for thrusting the filmstrip out of the cartridge and for rewinding the filmstrip back into the thrust cartridge.

The invention and its objectives and advantages will become more apparent in the detailed description of the preferred embodiment presented below.

BRIEF DESCRIPTION OF THE DRAWINGS

In the detailed description of the preferred embodiment presented below, reference is made to the accompanying drawings, in which.

DETAILED DESCRIPTION OF THE INVENTION

Figure 1:
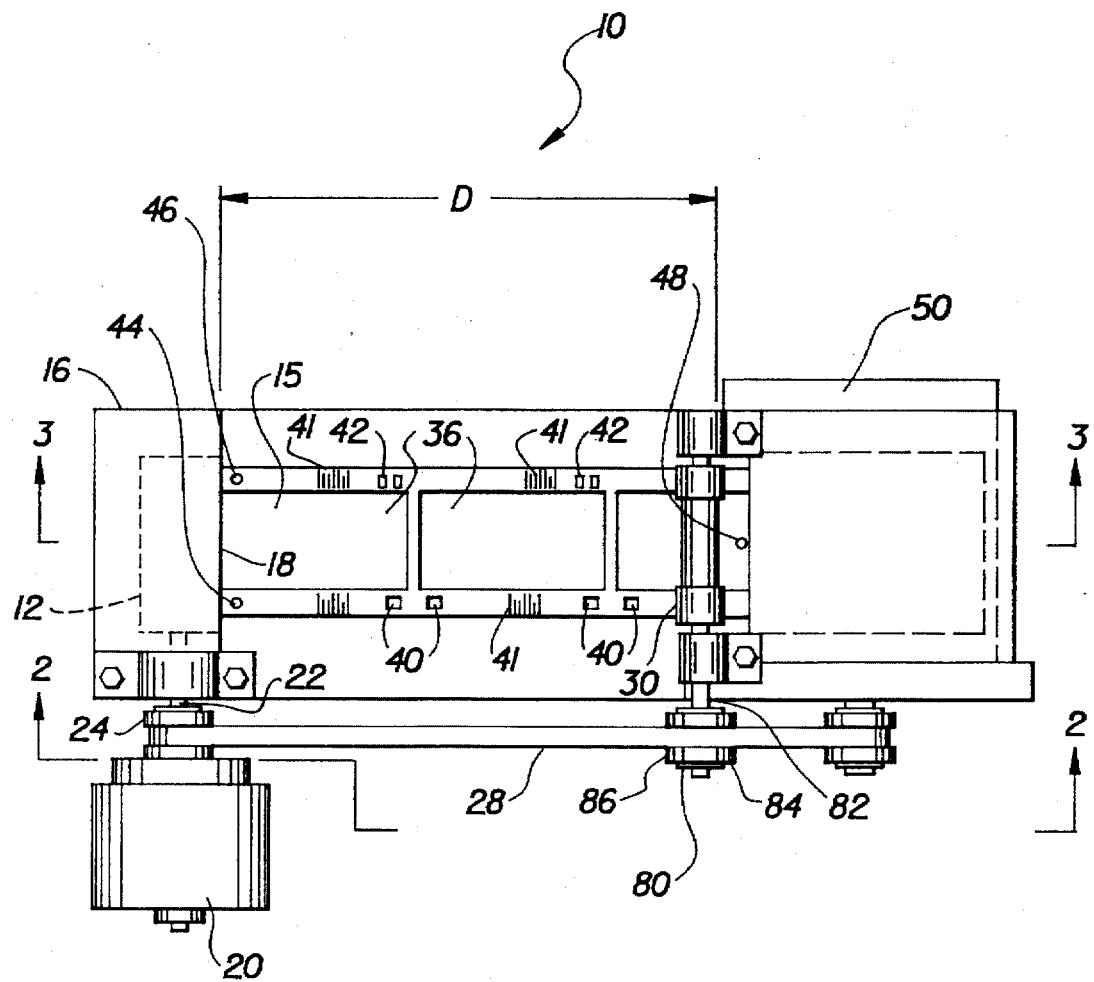
FIG. 1 is the top plan view of a mechanism made in accordance with the present invention for winding and unwinding a filmstrip from a thrust cartridge.

Referring to FIGS. 1–4, there is illustrated a mechanism 10 for driving a filmstrip out of and rewinding the filmstrip back into a thrust cartridge 12. Although mechanism 10 can be used in a variety of different photo handling equipment, the mechanism 10 in the embodiment illustrated is designed for use in a photographic printer for printing the negative image on the filmstrip onto photographic paper. The thrust cartridge 12 includes a spool 14 rotatably mounted to the sides of the thrust cartridge around which a filmstrip 15 is wound. By rotating the spool about its rotational axis the filmstrip 15 may be thrust out of the thrust cartridge 12 or rewound back into the thrust cartridge 12. The mechanism 10 includes means for holding the thrust cartridge. In the particular embodiment illustrated, there is provided a retaining block 16 having a nest 18 which is configured to closely conform to the outer configuration of the thrust cartridge 12 so as to maintain the thrust cartridge 12 in a predetermined position.

The mechanism 10 includes a first clutch 20 having a drive shaft 22 which is designed to extend into the nest 18 and engage the spool 14 of the thrust cartridge 12. Thus, when a thrust cartridge 12 is placed within the nest 18, the drive shaft 22 will engage the spool 14 so that the filmstrip 15 may be either thrust out of the cartridge 12 or rewound back onto the cartridge. The clutch 20 includes a drive gear 24 which is connected to a drive motor 26 by a drive belt 28. In the particular embodiment illustrated, the clutch 20 comprises an electric friction clutch and gear 24 is a timing gear. Thus, the clutch 20 can be easily energized (turned on) by providing power to the clutch or turned off (disengaged) by cutting off the power to the clutch 20. When the clutch 20 is electrically engaged, driving power will be allowed to be transmitted to the upper drive shaft 22 and when the clutch 20 is in the disengaged state, no driving power will be transmitted to the drive shaft 22. In the disengaged state, drive shaft 22 is free to rotate in either rotational direction. It is to be understood that any other clutch means may be utilized for controlling whether power is supplied to the upper drive shaft 22 for rotation of the spool 14.

The mechanism 10 further includes a pair of metering rolls 30,32 positioned a distance D from the nest 18. A film guide track 34 is provided from the nest 18 to the metering rolls 30,32 for guiding of the filmstrip 15 as it is being thrust out of the cartridge 12 or rewound back into the thrust cartridge 12. The distance D provides a work station wherein various operations may be conducted. For example, in the space provided by the guide track 34, various film image scanning devices may be provided for scanning of the image thereon or for exposing of the image onto the photographic paper. Additionally, in this area there may be provided other devices, such as magnetic heads, for reading or writing magnetic information on the film, or a bar code head for reading the code thereon. The information read may be used to control the printing at this work station or may be forwarded to a computer for later use in some other part of the photofinishing process.

Figure 2:
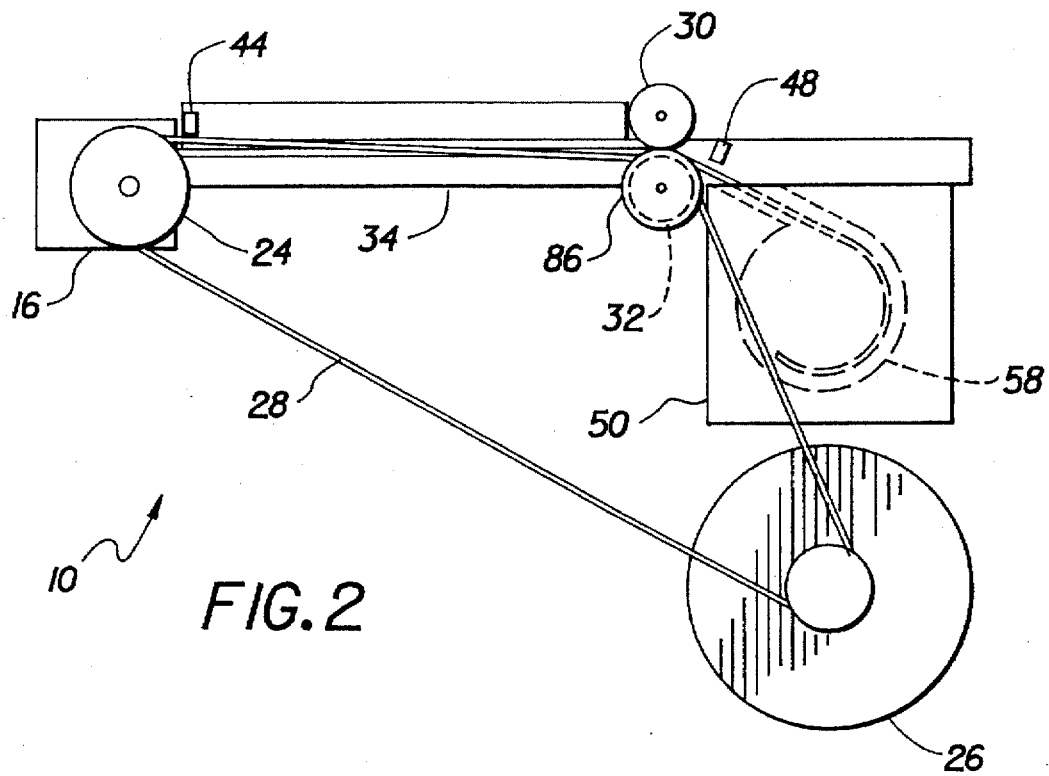
FIG. 2 is a side elevation view of the mechanism of FIG. 1 as taken along line 2—2.
Figure 3:
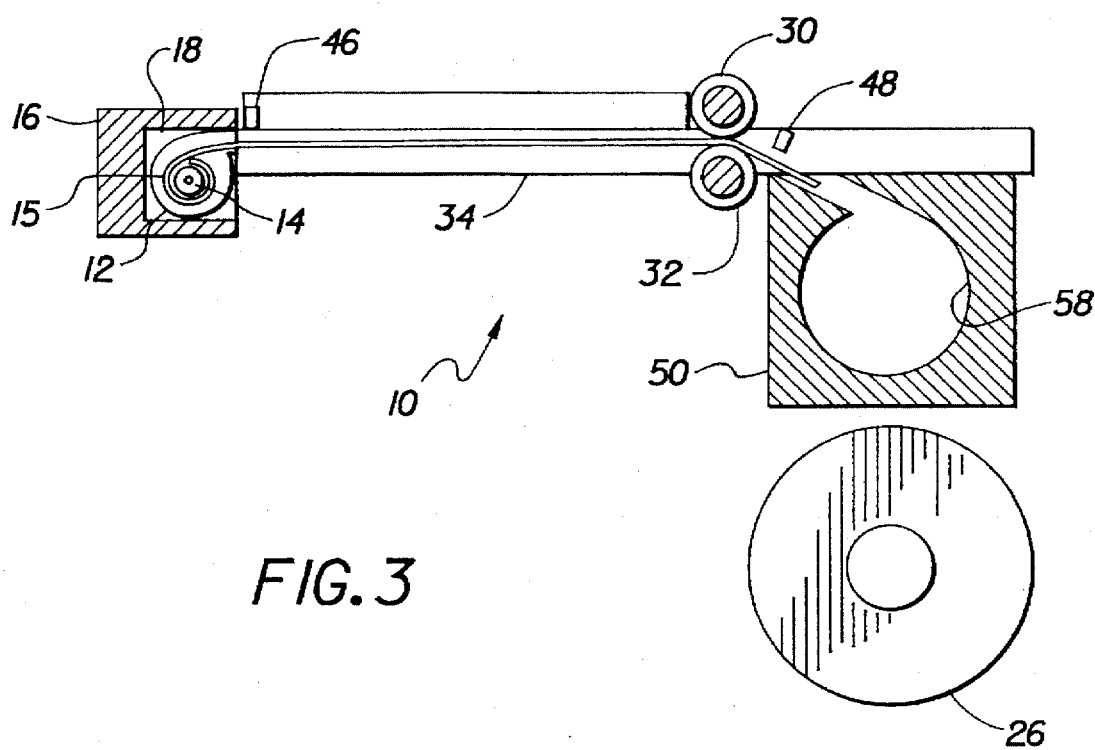
FIG. 3 is the cross-sectional view of the mechanism of FIG. 1 as taken along line 3—3.

Referring to FIGS. 1 and 2, a filmstrip has been initially thrust out of the cartridge 12 and has been passed through the metering rolls 30,32. The filmstrip 15 is provided with image areas 36. As is customary with filmstrips of prior art, the filmstrip 15 is provided with a plurality of perforations 40 along the edges which are used in the camera and various other photofinishing processes for transporting of the film. Additionally, as is also customary, the filmstrip 15 may be provided with bar code data 41 or fat bit code 42 along the edges of the filmstrip 15. Additionally, magnetic information may be provided in a magnetic layer provided over the entire filmstrip 15. The magnetic layer is very thin and is substantially transparent.

The mechanism is also provided with a pair of sensors 44,46 which are used to detect the end-of-roll perforation and the frame perforations. In the particular embodiment illustrated, sensor 44 is designed to monitor the end-of-roll perforation that is provided on the filmstrip 15 for determining when the last image exposed on the film has exited the cartridge 12. The sensor 46 is used to detect the frame perforation so that the images on filmstrip 15 may be properly positioned at the work station for printing.

The mechanism 10 also includes a film presence sensor 48 for determining when the film has passed a predetermined location. In the particular embodiment illustrated, the sensor 48 is disposed just after the metering rolls 30,32. Sensor 48 is used to determine when filmstrip 15 has passed through the metering rolls.

Figure 4:
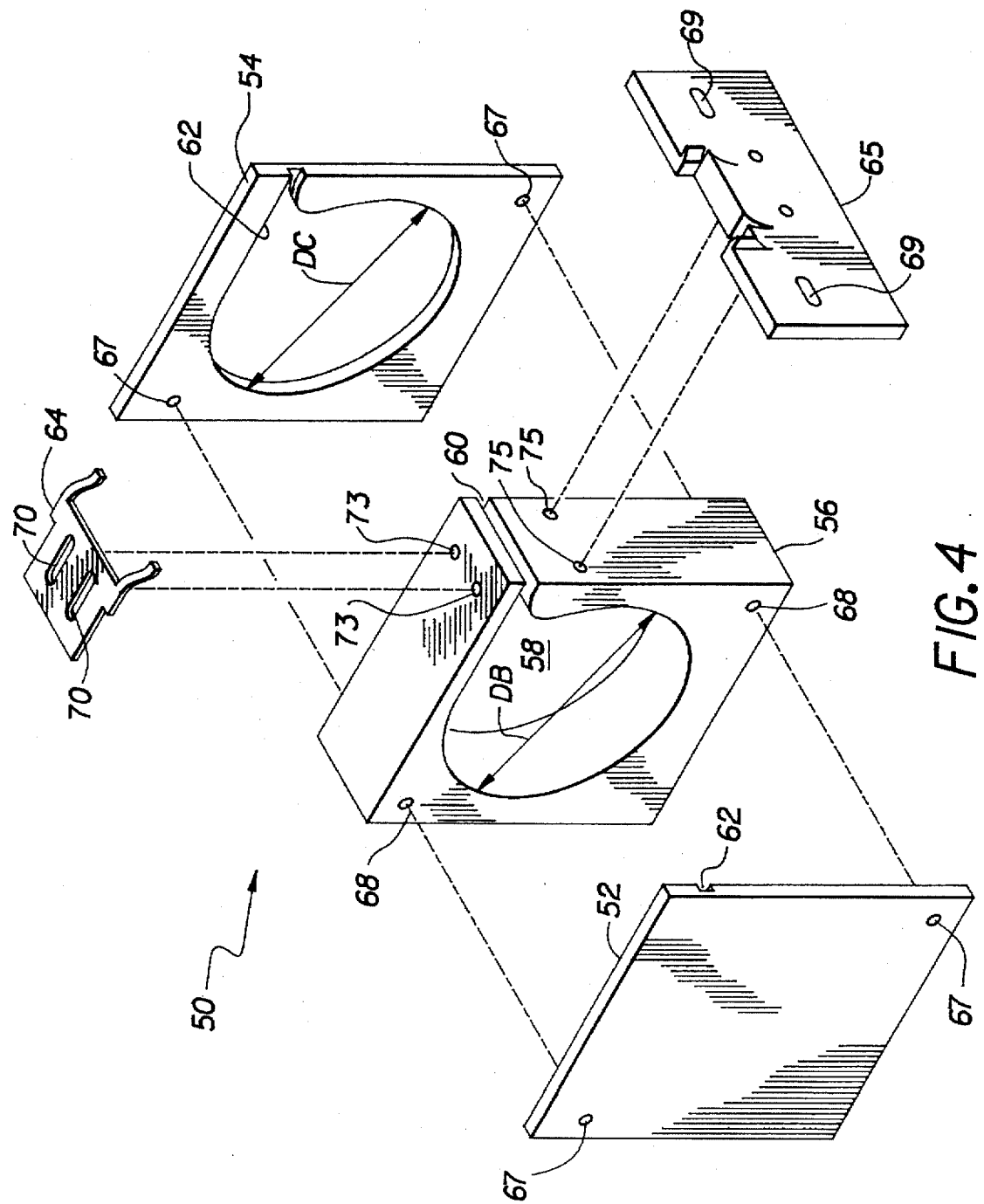
FIG. 4 is an enlarged exploded view of the festoon illustrated in FIGS. 1, 2 and 3 which is used to take up the filmstrip which has been unwound from the thrust cartridge.

A festoon 50 is provided for taking up of the filmstrip 15 after it has passed through the metering rolls 30,32. The festoon 50 preferably is designed such that the surface of the filmstrip 15 does not contact the surface of the festoon 50. Referring to FIG. 4, there is illustrated an exploded and enlarged view of the festoon 50. The festoon 50 comprises a pair of side plates 52,54 which sandwich a central body portion 56 therebetween. The body portion 56 has a generally circular receiving cavity 58 having an outlet/inlet 60 for allowing the filmstrip 15 to enter and exit the festoon 50. The side plates 52,54 are each provided with a recessed circular channel 62 which is designed to engage one of the outer edges of the filmstrip 15. The diameter DC of the recessed channel 62 is slightly smaller than the diameter DB cavity 58 such that the surface of the filmstrip 15 having the image therein will not contact the surface of festoon 50. In the particular embodiment illustrated, guide members 64,65 are provided so as to properly guide the filmstrip 15 into the festoon 50. The plates 54 are secured to the body portion 56 in any conventional manner. In the particular embodiment illustrated, the side plates are simply fastened by screws (not shown) which pass through openings 67 in the side plates 52,54 and engage threaded openings 68 in the body portion 56 to secure the side plate 52 to the body portion 56. Likewise, the guide members 64,65 are secured by appropriate fastening members (not shown) in body portion 56. For example, screws which pass through openings 69 and 70 in guide members 64,65 engage threaded openings 73,75 in the body portion 56.

Referring back to FIGS. 1 and 2, one of the metering rolls 30,32 is connected to a second clutch 80 having a drive shaft 82. The drive shaft 82 is connected to metering roll 32 so as to impart rotational movement. In the particular embodiment illustrated, the clutch 80 comprises a bearing 84 which is pressed into drive pulley 86. In the particular embodiment illustrated, the pulley 86 is a timing gear. The drive belt 28 that drives clutch 20 also engages the drive pulley 86 of clutch 80. In the particular embodiment illustrated, as can be seen in FIG. 2, the belt 28 also engages the drive pulley 86 secured to the shaft of drive motor 26. Thus, it can be seen that the drive belt 28 connects the drive motor 26 to clutches 20 and 80 so that appropriate drive power may be provided to the respective drive shafts 22,82. In the embodiment illustrated, the clutch 80 is designed only to operate in a single direction. In particular, the clutch 80 is designed only for driving up the filmstrip 15 into the festoon 50. When the motor 26 is operated in the opposite direction, so as to rewind the filmstrip 15 back into the thrust cartridge 12, the clutch bearing 80 will freely rotate without any power being transferred to the drive shaft 82.

In order to more fully understand the present invention a brief description of its operation will now be discussed.

Initially a thrust cartridge 12 is placed into the nest 18 so that the spool 14 engages the drive shaft 22 of clutch 20. The motor 26 is engaged and the switch turned on so as to engage clutch 20 thereby causing the filmstrip 15 to be thrust out of the cartridge 12 into the film guide track 34 toward the metering rolls 30,32. The filmstrip 15 is fed between the metering rolls 30,32 which are also being operated by the motor 26 at this point in time. However, once the filmstrip 15 passes sensor 48, adjacent metering rolls 30,32, a signal is sent to computer 88 or other switching device for deactivating clutch 20. At this point in time, the metering rolls 30,32 will continue to drive the filmstrip 15 from the cartridge 12 into the festoon 50. The metering rolls 30,32 will continue to drive the filmstrip 15 into the festoon 50 stopping and starting, as appropriate, to allow exposure of images on the filmstrip at the work station so that the images therein will be properly printed. The metering rolls 30,32 provide accurate velocity control of the filmstrip 15 so that the magnetic information placed on the filmstrip 15 can be accurately read. Sensor 46, which can determine the frame positioning, is used for starting and stopping of the motor 26 for operating the metering rolls 30,32 so as to accurately position the image 36 at the work station for printing and for any other operation required. When the sensor 44 determines that the end of the roll has been reached, the metering rolls 30,32 will be stopped and after completion of any operation of the mechanism, the motor 26 will be operated in the opposite direction and the clutch 20 engaged so as to rewind the filmstrip 15 back into the thrust cartridge 12. The sensors 44,46 can be used to shut off the motor after the filmstrip has passed sensing points. Thereafter the thrust cartridge 12 can be removed and another one positioned in its place and the above procedure repeated.

Thus there is provided a mechanism for driving a filmstrip out of a thrust cartridge and rewinding the filmstrip back into the cartridge which is compact in design and which uses only a single drive motor.

It is to be understood that various changes and modifications may be made without departing from the scope of the present invention, the present invention being limited by the following claims.

Parts List 10 mechanism
12 cartridge
14 spool
15 filmstrip
16 block
18 nest
20 clutch
22 drive shaft
24 drive gear
26 drive motor
28 drive belt
30,32 metering rolls
34 guide track
36 image areas
40 perforations
41 code data
42 bit code
44,46 sensors
48 presence sensor
50 festoon
52,54 side plates
56 central body portion
58 receiving cavity
60 outlet/inlet
62 circular channel
64,65 guide members
67,69,70 openings
68,73,75 threaded openings
80 clutch
82 drive shaft
84 bearing
86 drive pulley

We claim:

1. A drive mechanism for driving film out of and rewinding film back into a thrust film cartridge, said thrust film cartridge having a rotatable spool mounted therein around which is wound a photographic filmstrip, said drive mechanism comprising:

a nest for holding the thrust cartridge in a predetermined position;

a first clutch having a first drive shaft adapted to engage with said spool for rotating said spool;

a pair of metering rolls positioned next to said nest so that said pair of metering rolls will engage the filmstrip therebetween for advancing the filmstrip out of said thrust cartridge, wherein one of said metering rolls has a second drive shaft;

a second clutch connected to said second drive shaft of one of said metering rolls;

a single drive motor;

a connecting linkage for connecting said motor to said first and second clutches so as to impart rotational motion to said first and second drive shafts through said first and second clutches; and control means for selectively activating said first and second clutches so as to drive the metering rolls and said spool in a predetermined direction so as to move the film out of or back into the thrust cartridge.

2. A drive mechanism according to claim 1 wherein said linkage comprises a belt, said first and second clutches each having a timing gear for transferring the motion from said motor to said first and second shafts.

3. A mechanism according to claim 1 wherein there is provided a festoon for taking up excess filmstrip as it passes said metering rolls.

4. A mechanism according to claim 1 wherein there is provided a film presence sensor for determining when said film strip is passed a predetermined location.

5. A mechanism according to claim 4 wherein said predetermined location is immediately following said metering rolls.

6. A mechanism according to claim 1 wherein said first clutch comprises an electric friction clutch.

7. A mechanism according to claim 1 wherein said second clutch comprises a clutch bearing.

8. A drive mechanism according to claim 1 further comprising a film track for guiding the filmstrip along a predetermined path.

9. A drive mechanism according to claim 1 wherein said metering rolls are driven at a substantially constant velocity.

10. A method of driving a filmstrip out of and rewinding the filmstrip back into a thrust cartridge, said thrust cartridge having a rotatable spool mounted thereon around which is wound a photographic filmstrip, said method utilizing a single drive mechanism, for winding and unwinding the filmstrip comprising the steps of:

a) thrusting the filmstrip out of said thrust cartridge by a drive mechanism which is connected to a first clutch for rotating the spool on which the filmstrip is wound;

b) providing a pair of metering rolls positioned next to said nest so that said pair of metering rolls can engage the filmstrip and a sensor for sensing when the filmstrip has been initially passed through the metering rolls, one of said metering rolls being connected to said drive mechanism through a second clutch for driving said metering rolls;

c) disengaging the first clutch connected to said drive mechanism after said film strip has been passed through the metering rolls;

d) driving the metering rolls for continued thrusting of the filmstrip out of the cartridge, e) stopping the thrusting of the filmstrip from out of the thrust cartridge by said metering rolls when the filmstrip has reached a predetermined position;

f) disengaging the second clutch connected to said drive mechanism so as to stop driving of said metering rollers; and g) activating the first clutch and said drive mechanism so as to rewind the filmstrip back into the thrust cartridge.

11. A method according to claim 10 wherein said metering rolls are driven at a substantially constant velocity.

12. A drive mechanism for driving film out of and rewinding film back into a thrust film cartridge, said thrust film cartridge having a rotatable spool mounted therein around which is wound a photographic filmstrip, said drive mechanism comprising:

means for holding the thrust cartridge in a predetermined position;

a first clutch having a first drive shaft adapted to engage with said spool for rotating said spool;

film drive means positioned next to said nest so that said pair of metering rolls can engage the filmstrip therebetween and for advancing the filmstrip out of said thrust cartridge, said film drive means having a second drive shaft;

a second clutch connected to said second drive shaft;

a single drive motor;

a connecting linkage for connecting said drive motor to said first and second clutches so as to impart rotational motion to said first and second drive shafts through said first and second clutches; and control means for selectively activating said first and second clutches so as to drive the film drive means and said spool in a predetermined direction so as to move the film out of or back into the thrust cartridge.

13. A drive mechanism according to claim 12 wherein said film drive means comprises a pair of metering rolls.

* * * * *